Dec. 30, 1958

G. SMILEY 2,866,870

ROTARY ARMATURE AND STATOR FOR USE IN RELAYS

Filed May 24, 1957

INVENTOR.
GILBERT SMILEY
BY
EZEKIEL WOLF
HIS ATTORNEY

Dec. 30, 1958   G. SMILEY   2,866,870
ROTARY ARMATURE AND STATOR FOR USE IN RELAYS
Filed May 24, 1957   2 Sheets-Sheet 2

INVENTOR.
Gilbert Smiley
BY Ezekiel Wolf
his Attorney

United States Patent Office 2,866,870
Patented Dec. 30, 1958

2,866,870

ROTARY ARMATURE AND STATOR FOR USE IN RELAYS

Gilbert Smiley, Hingham, Mass., assignor to S. H. Couch Company, Inc.

Application May 24, 1957, Serial No. 661,544

14 Claims. (Cl. 200—93)

The present invention relates to a rotary armature and stator particularly adapted for use in a polarized relay.

The present invention provides a rotor and stator arrangement of improved design which particularly lend the structure for adaptation in rotary relay design. The object of the invention is to provide a rotary relay which provides a choice of two actions dependent upon the polarity of energization of relay winding. Thus, there is provided a stator having radially balanced poles adapted to be energized simultaneous to the same polarity. Co-operating with the stator is a permanent magnet rotor with radially arranged permanent poles adapted to be pivoted into flux coupling with the stator. Also provided is a tensioning means adapted to restore the rotor to a neutral or non-operating position. These permanent rotor poles are so radially arranged that when the stator is energized like rotor poles will be flux coupled to the stator poles of opposite polarity to the rotor poles. By this arrangement we are able to obtain a structure in which the rotor can be returned to a neutral position without the necessity of overcoming a large permanent magnetic keeper effect.

In devices made in accordance with this invention, the rotor is permanently polarized with poles arranged radially about the periphery of the rotor, in such a manner that in any rotor position with the stator de-energized there is no keeper effect other than the residual magnetism in the stator that would tend to resist the torque restoring the rotor to a neutral position.

In one embodiment of this invention the keeper effect is avoided, as as alternately stated there is a zero radial permanent magnetic force between rotor and stator due to the elimination of continuous flux conductive members between the permanent north and south poles of the rotor.

In another embodiment of this invention the keeper effect is avoided, or as alternately stated there is a zero radial permanent magnetic force between the rotor and stator as there is provided equal and opposite flux paths between the poles, in all positions of the armature poles resulting in a cancellation of permanent magnetically induced rotary forces.

In addition to the objects above enumerated, the present invention is designed to provide a rotary relay of simple and rugged construction in which the relay may be operated with substantial efficiency and economy.

It is also an object of the present invention to provide a rotary relay in which the armature is formed of a permanent magnet having at least four poles insulated from and in which the stator is provided with poles about the periphery of the rotor or armature with these peripheral stator poles all being of the same polarity. With this basic arrangement radial flux paths through the armature and stator will be avoided or minimized thus avoiding the "keeper" effect of the permanent magnet flux appearing in the conventional rotary relays of this type.

It is also an object of the present invention to provide a rotary relay in which the armature is formed of a permanent magnet having a plurality of radially arranged poles adapted to be flux coupled with poles of a toroidal electromagnetic stator. In this arrangement, regardless of the rotor position, the reluctance of the toroid to the flux coupling the rotor poles is the same in either direction through the toroid. This condition is in effect when the stator is de-energized and does not take into account residual flux which may be considered negligible.

These and other objects and advantages of the present invention will be more clearly understood when considered in connection with the accompanying drawings in which.

Figure 1:
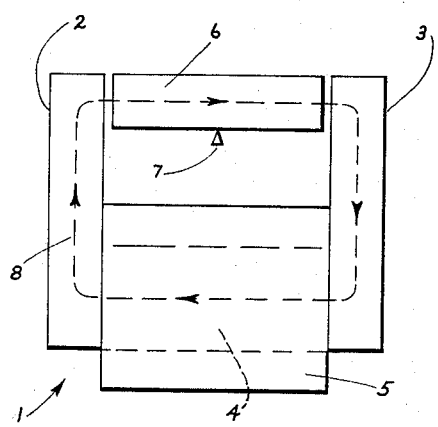
Figures 1 and 2 are respectively side and top plan schematic views of a device illustrated for the purpose of explaining the principle upon which the present invention is based.
Figure 2:
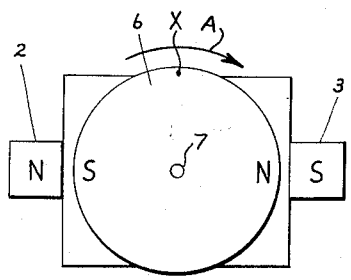

Refer first to Figures 1 and 2 respectively. In this arrangement there is provided a U-shaped stator 1 having legs 2 and 3 with a bight section 4. This stator may be made of a soft magnetic metal with a coil 5 wound about the bight section of this stator, thus forming an electromagnet. An armature 6 may be rotated from a neutral position in which the point X is adjacent the stator N pole clockwise in the direction of the arrow A. This armature 6 may be formed of permanent magnetic material having a pair of poles as illustrated in Figure 2. Upon energization of the coil 5, the armature 6 will orient itself as illustrated in Figure 2. Upon de-energization of the coil 5, the armature 6 will return to a normal neutral position if a proper tensioning force is applied. Such a force may take the form of a spring or similar member. The force required to rotate the armature 6 so that its permanent magnet is no longer in alignment with the poles formed by the legs 2 and 3 may be substantial even though the coil 5 is de-energized. This is due to the fact that the soft magnetic material forming the stator acts as a keeper after de-energization of the coil 5. Thus a magnetic flux is formed as indicated by the dotted lines 8. This path of magnetic flux through the stator acting as a keeper must be overcome by the restoring force which is applied to the armature 6.

Figure 3:
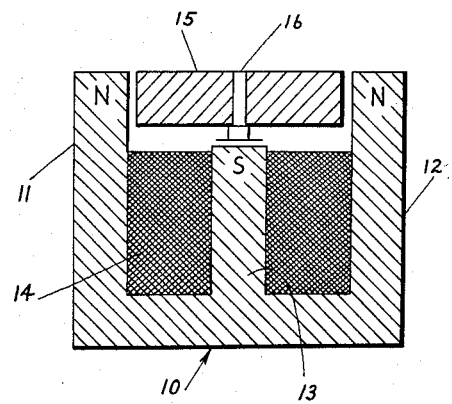
Figures 3 and 4 are respectively side and top plan schematic views of an embodiment of the present invention.
Figure 4:
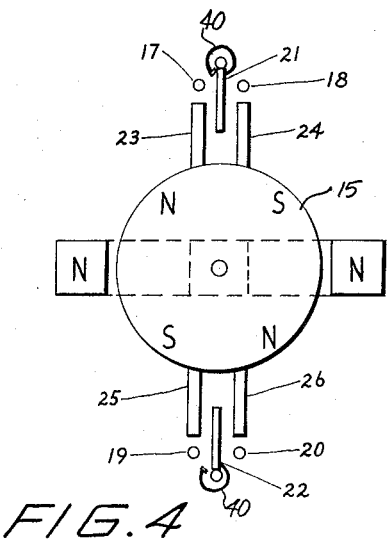

The disadvantages of the structure illustrated in Figures 1 and 2 are overcome by the structure schematically illustrated in Figures 3 and 4. In this arrangement there is provided a stator 10 of E-shaped cross section having outer legs 11 and 12 and a shorter center leg 13. The stator is wound with the coil 14. This stator may be made of laminated metal sheet by conventional practice and is formed of soft iron material.

An armature 15 herein shown in cylindrical form is mounted coaxial with the center leg 13. This armature 15 is made of permanent magnetic material and is formed as herein shown with four poles, illustrated in Figure 4. The armature 15 may be mounted and insulated from the stator 10 by suitable bearings and insulating means schematically illustrated at 16. These insulating means may comprise a dielectric pin pivotally supporting the armature 15. These insulating means eliminate a keeper effect of the stator from the outer legs 11 and 12 through the bottom to the center leg 13. Additionally a keeper effect is avoided by utilization of four poles in the rotor 15 as indicated.

The diameter of the armature 15 is slightly less than the space between the legs 11 and 12. The air gap between the armature and these legs should be as small as possible. Pairs of electrical contacts 17 and 18, 19 and 20 may be mounted at diametrically opposite positions beyond the periphery of the armature 15. Contact blades 21 and 22 may be pivotally mounted respectively between these contacts. The blades 21 and 22 may be spring tensioned in radial alignment with the pivots 16. The contacts as well as the blades may be supported upon a suitable mount which, if desired, may also be secured to the remaining components of the relay, with such mount being of a non-conductive material. Two pairs of projecting legs 23 and 24, 25 and 26 are formed on either side of the armature 15 with the legs 23 and 24 extending on either side of the blade 21 and legs 25 and 26 on either side of the blade 22. These legs are adapted to be engaged with the blade located between their ends. Upon energization of the coil 14 the rotor 15 will turn from the neutral position illustrated in Figure 4 to a position in which the unlike poles of the armature and stator are aligned. In this energized position the blades 21 and 22 will be pivoted into electrical engagement with one each of the contacts. In the specific diagram illustrated in Figure 4 the blade 21 upon energization of the coil 14 will be forced against contact 18 by the pressure of the leg 23 while the blade 22 will be forced against the contact 19 by the leg 26. Upon de-energization of the coil 14 the spring tension of the contact blades 21 and 22 will return the armature to its neutral, de-energized position with the spring tension blades 21 and 22 pushing respectively against the legs 23 and 26. As will be observed from Figures 3 and 4 there are no substantial flux paths coupling the opposite poles of the rotor as there will be always at least one of each pair of poles spaced from the stator. Stated in other terms, there is no net magnetic force (except for negligible residual magnetism of the stator) which tends to hold the rotor in the position which it assumes when the stator is energized, once the stator is de-energized. This is due to the effective elimination of the flux paths through the stator by substantially spacing one of each pair of poles of the rotor from the stator frame. It therefore follows that a smaller amount of torque need be applied by the blades 21 and 22 to restore the armature to its neutral position. Since a lesser amount of torque is required the spring means 40 utilized to obtain this restoring torque need not be as great as in the case of the previously mentioned structure.

While this embodiment has been described in connection with a simplified version of the invention, various modifications are fairly obvious, thus, in place of the E-shaped stator as illustrated a six pole rotor with three outside legs or eight pole rotor with four outside legs may be utilized. In such an arrangement the outside legs should be evenly spaced.

The rotor itself should be made of a highly permanent magnetic material which is resistant to de-magnetization. A magnetic rotor of manganese-bismuthide powder molded in a dielectric plastic material could be utilized. The utilization of such a material for the armature is advantageous in that it would permit the molding of the legs with the armature without further requirements of insulating the legs from the switch blades. If a rotor of other material, as for example, Alnico is utilized the legs 23, 24, 25 and 26 must be otherwise insulated from the blades 21 and 22. This may be accomplished by forming a dielectric bead on the legs which would space these legs from the blades.

It will also be noted that the rotor may be caused to rotate in either direction depending upon the polarity of the coil energizing current. Thus, a reversal of direct current in the winding reverses the direction of rotation. If it is desired to utilize this relay with an alternating current source, the use of a rectifier in the circuit will permit such operation.

Figure 5:
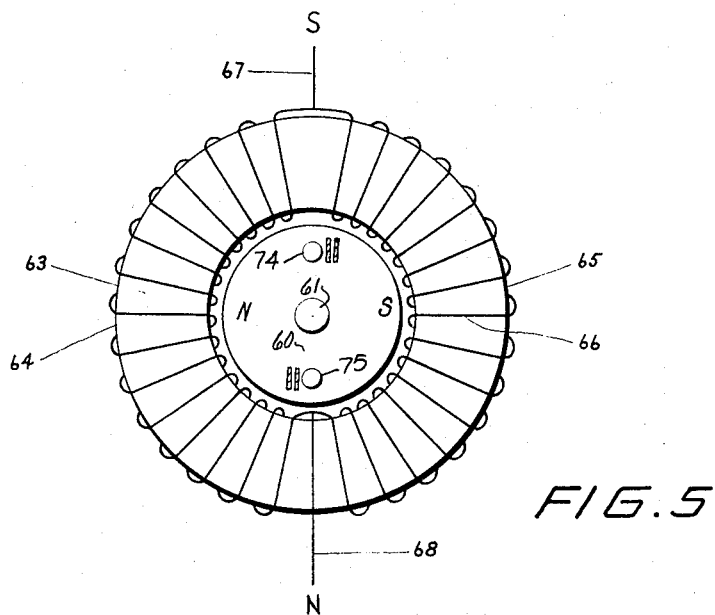
Figures 5 and 6 are top and side plan schematic views of a modification of the present invention.
Figure 6:
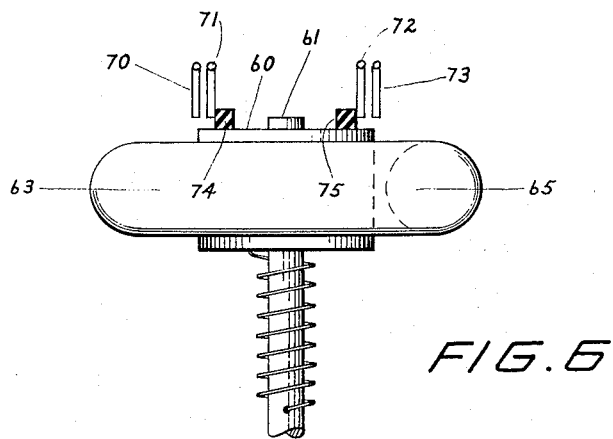

Figures 5 and 6 disclose a modification of the invention in which the rotor 60 is axially pivotally mounted on a fixed shaft 61 with suitable bearing means (not shown). This rotor has a pair of peripherally arranged poles of opposite polarity. While the rotor is shown as cylindrical it may assume other shapes provided the poles are rotatable in close approximation to the inner surface of the stator 63. This stator 63 is formed of a soft metal conductive toroid coaxial with the rotor. Each half of the toroid 64 and 65 is wound in opposite directions with wire 66. The wire is topped with leads 67 and 68 at the junction of the oppositely wound sections. Thus, the toroid forms an electromagnetic stator with a polarity in alignment with the above mentioned junctions as is indicated by the letters N and S. (These may of course be reversed depending upon the direction of the energizing current.) Slots may be cut into the inner surface of the toroid to accommodate the wire 66 whereby the air gap between the rotor and stator may be reduced. There is also provided in this arrangement a restoring force for returning the rotor to a neutral position when the stator is de-energized. This may take the form of a helical spring 69 coaxial with the shaft 61 and secured at one end to the shaft 61 and at the other to the rotor 60. Suitable contacts are also provided to be operated by rotation of the rotor 60. These may be of any selected type and of conventional arrangement as, for example, the leaf contacts 70, 71 and 72, 73 adapted to be engaged and closed by action of the insulated bosses 74 and 75 respectively carried on the rotor 60. The leaf contacts as well as the toroid and shaft are suitably mounted upon a frame with the leaf contacts electrically connectable into circuits.

In this modification a dynamic balance is obtained when the stator is de-energized (disregarding residual flux which is negligible) by providing flux paths between the poles of the rotor through the toroid in either direction with equal reluctance in either path, thus providing a continuously balanced unit. Thus, regardless of the position of the rotor, where a two pole rotor is used the flux will be coupled through the toroid in either direction with each path occupying one-half of the toroid and with each of these halves having the same reluctance.

It will be noted that this structure presupposed the minimizing of the air gap between rotor and stator with this gap being uniform at all positions of the rotor.

This modification of the invention contemplates other embodiments than that disclosed above, as for example, the provision of a rotor having four radially arranged poles. In this case the rotation of the rotor will be reduced.

In the preceding disclosures the effect of residual magnetism has been disregarded as it, in a properly constructed structure, is of negligible effect.

Having now described my invention I claim:

1. In an armature and stator arrangement, the combination of a permanent magnet armature having at least 4 radially arranged coplanar poles, and an E-shaped electromagnetic stator having outer legs of polarity opposite the center leg, said outer legs being arranged at opposite sides of the periphery of said armature.

2. In an armature and stator arrangement, the combination of a permanent magnet armature having an even number of at least 4 poles, and an electromagnetic stator having an outer leg for each pair of poles arranged about the periphery of said armature, a center leg electrically continuous with said outer legs, said outer legs having a polarity opposite said center leg and non-ferromagnetic means insulating said center leg from said armature.

3. In an armature and stator arrangement, the combination of a permanent magnet armature having an even number of at least 4 poles, an electromagnetic stator having an outer leg for each pair of poles, and a center leg continuous with said outer legs, said poles and outer legs being coplanar with the outer legs being arranged about the periphery of said armature and said center leg being arranged coaxial with said armature, said outer legs having a polarity opposite said center leg and non-ferromagnetic insulating means insulating said center leg from said armature.

4. In an armature and stator arrangement, the combination of a permanent magnetic armature having at least 4 poles and an electromagnetic stator having a plurality of like poles positioned to be coupled flux-wise with said armature poles, said stator having at least one other pole of polarity opposite said like poles positioned more remotely from and thereby flux insulated from said armature.

5. In an armature and stator arrangement, the combination of a permanent magnetic armature having an even number of at least 4 poles and an electromagnetic stator having like poles for each pair of armature poles arranged about said armature at circumferential distances equal to twice the circumferential spacing of said armature poles, said stator having at least one other pole of polarity opposite said like poles spaced and thereby flux insulated from said armature.

6. In an armature and stator arrangement, the combination of a permanent magnet armature having an even number of at least 4 poles, and an E-shaped electromagnetic stator having an outer leg for each pair of poles, a center leg continuous with said outer legs, and an inductive winding about said center leg said outer legs arranged about said armature at circumferential distances equal to twice the circumferential spacing of said armature poles, said legs forming stator poles with the outer legs all of a polarity opposite said center leg and with said center leg flux insulated from said armature.

7. A rotary relay structure comprising an electromagnetic stator having a plurality of radially arranged outer poles of the same polarity, a center pole continuous with said outer poles and an inductive winding about said center leg, a rotatable permanent magnetic armature having a pair of poles for each outer pole, means mounting said armature for rotation with said center pole flux insulated from said armature poles, means operative on de-energization of said winding for rotating said armature poles into nonalignment with the outer poles of opposite polarity, and switch contact means operative on rotation of said armature.

8. A device as set forth in claim 7 wherein said switch contact means comprises a pivotable blade operatively moveable between two contact points, and means operatively interengaging said armature and blade.

9. A device as set forth in claim 7 wherein said switch contact means comprises a pivotable blade operatively moveable between two contact points and said armature is formed of a cylindrical magnet with radially projecting members operatively engaging said blade.

10. In an electromagnetic device an armature and stator arrangement, having like stator poles and armature poles of polarity opposite said stator poles, said poles arranged about a common axis with said armature poles adapted to be radially aligned and magnetically flux coupled with said stator poles, said stator also having poles of a polarity opposite said like poles, and non-ferromagnetic means insulating said second mentioned stator poles from said armature.

11. In an armature and stator arrangement a permanent magnetic armature and an electromagnetic toroidal stator having an annular space therebetween of uniform width, thereby providing paths of equal reluctance flux coupling the poles of said armature, whereby the keeper effect of said stator in its deenergized state is nullified.

12. An armature and stator arrangement comprising a permanent magnetic armature having a pair of poles and a coaxially mounted toroidal electromagnetic stator having a pair of poles, said stator providing semi-circular paths of equal reluctance for flux coupling said armature poles in either direction about the circumference of said stator.

13. An armature and stator arrangement comprising a permanent magnetic armature having a pair of poles and a coaxially mounted toroidal electromagnetic stator having a pair of poles, said stator providing balancing circumferential paths of equal reluctance for flux coupling said armature poles in either direction through said stator, and means for tensioning said armature in a selected position on de-energization of said stator.

14. In combination a permanent magnetic armature and an electromagnetic stator including means providing paths of equal reluctance flux coupling said armature poles thereby nullifying the keeper effect of said stator in its de-energized state.

References Cited in the file of this patent

UNITED STATES PATENTS

| | | |
|---|---|---|
| 1,155,502 | Moore | Oct. 5, 1915 |
| 2,101,665 | Arey et al. | Nov. 19, 1935 |
| 2,175,046 | Warner | Oct. 3, 1939 |
| 2,422,861 | Skrobisch | June 24, 1947 |
| 2,445,401 | Langer | July 20, 1948 |
| 2,499,632 | Coake | Mar. 7, 1950 |
| 2,635,155 | Barr | Apr. 14, 1953 |
| 2,722,581 | Wittke | Nov. 1, 1955 |